United States Patent [19]

Mihara

[11] Patent Number: 4,659,190
[45] Date of Patent: Apr. 21, 1987

[54] COMPACT PHOTOGRAPHIC CAMERA LENS SYSTEM HAVING AN ASPHERICAL SURFACE OF SHORT OVERALL LENGTH

[75] Inventor: Shin-ichi Mihara, Hachioji, Japan

[73] Assignee: Olympus Optical Company, Ltd., Tokyo, Japan

[21] Appl. No.: 718,705

[22] Filed: Apr. 1, 1985

[30] Foreign Application Priority Data

Jul. 2, 1984 [JP] Japan ................. 59-136886

[51] Int. Cl.⁴ .................. G02B 9/34; G02B 13/18
[52] U.S. Cl. ................................................. 350/432
[58] Field of Search ...................................... 350/432

[56] References Cited

U.S. PATENT DOCUMENTS

| | | | |
|---|---|---|---|
| 4,359,271 | 11/1982 | Mihara | 350/432 |
| 4,368,956 | 1/1983 | Yamada et al. | 350/432 |
| 4,443,069 | 4/1984 | Mihara | 350/432 |
| 4,456,345 | 6/1984 | Fujibayashi | 350/432 |

*Primary Examiner*—John K. Corbin
*Assistant Examiner*—Rebecca D. Gass
*Attorney, Agent, or Firm*—Louis Weinstein

[57] ABSTRACT

A compact photographic camera lens system for use in a compact camera using Leica size film. In order to reduce the overall length of the lens system and the number of constituent lens elements of the lens system, an aspherical surface is introduced into part of the lens system and aberrations are properly corrected up to a field angle of approximately 63°.

22 Claims, 5 Drawing Figures

COMPACT PHOTOGRAPHIC CAMERA LENS SYSTEM HAVING AN ASPHERICAL SURFACE OF SHORT OVERALL LENGTH

BACKGROUND OF THE INVENTION (a) Field of the Invention

The present invention relates to a compact photographic camera lens system having an aspherical surface of short overall length, and more particularly, to a compact photographic camera objective using Leica size film, which is so designed that an aspherical surface is introduced into part of the lens system to minimize overall length as well as reducing the number of lens component of the lens system and where the aberrations of the lens system are properly corrected up to a field angle of around 63°.

(b) Description of the Prior Art

In general, a field angle of around 63° is chosen for compact photographic camera objectives using Leica size film. In order to design lens systems of this kind as very compact systems having a telephoto ratio of 1.0 and lower, it is necessary to locate the rear principal point of the entire lens system before the first lens surface. For the purpose of satisfying this requirement, it is considered to adapt a lens type generally used as telephoto lenses comprising a front lens group designed as a converging lens system and a rear lens group designed as a diverging lens system. With the telephoto type lens system, however, it is extremely difficult to properly correct offaxial aberrations.

A lens system construction similar to that used in the present invention is disclosed in the Japanese Laid Open Patent Application No. Sho 55/1980-73014 in which a lens system is formed of only spherical lens systems. On the other hand, a lens system in which aspherical surfaces are formed on both sides of a fourth lens component is disclosed in the Japanese Laid Open Patent Application No. Sho 56/1981-59217 of the same inventor which has been made with the object of improving performance of the lens system in the former application in the marginal portions of the image plane. Specifically, a compact photographic camera lens system of short overall length is provided by introducing an aspherical surface at an extremely effective position for correcting aberrations in marginal portions of an image plane so that the aberrations are properly corrected. To achieve this purpose, the prior application indicates that the sufficient requirement is to introduce two aspherical planes into part of a lens system. However, the aspherical surface is disadvantageous in manufacturing due to difficulty of processing and inspection and accordingly presents an unavoidable expense. Therefore, it is apparently advantageous in manufacturing to reduce the number of aspherical surfaces to one. In this case, a problem is that, even if the number of aspherical surfaces to be introduced is reduced to one, how the same lens performance as that of a lens having two aspherical surfaces can be obtained.

SUMMARY OF THE INVENTION

It is an object of the present invention to provide a compact photographic camera lens system having a telephoto ratio smaller than 1.0 which is so adapted as to have a very short overall length by using a lens system of the telephoto type including four components of four lens elements and by introducing an aspherical surface into only one side of a fourth lens component and which is arranged such that the aspherical surface has an especially large aspherical constant of the sixth order and a small aspherical constant of the lower orders than the fourth order so as to be effective only to the higher order correction regarding offaxial rays, thereby properly correcting offaxial aberrations without adversely affecting paraxial aberrations so that a field angle up to around 63° can be obtained and the overall length of the lens system can be minimized.

According to the present invention, the number of aspherical surfaces is limited to at most one so as to facilitate manufacturing and yet wherein noticeable effect on the correction of aberrations can be obtained even with one aspherical surface which is designed such that terms higher than the sixth order of the aspherical surface is made much larger than terms lower than the fourth order and the airspace between a front and rear lens groups is increased. As shown in aberration characteristics curves in the accompanying drawings, correction of aberrations particularly at a position of around 0.8 to 0.9 times the maximum image height is fully improved compared with a spherical surface system and it is possible to obtain the same effect as that of a system having two aspherical surfaces.

DETAILED DESCRIPTION OF THE PREFERRED EMBODIMENTS

Figure 1:
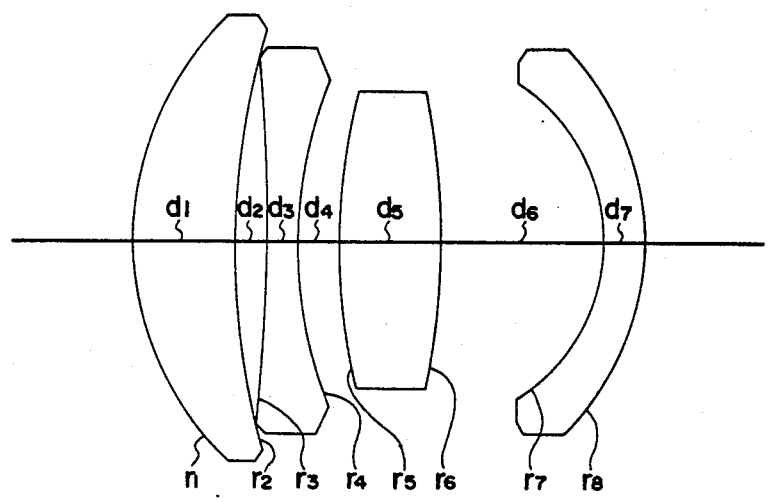
FIG. 1 is a sectional view illustrating a lens construction according to Embodiments 1 and 2 of the present invention.
Figure 4:
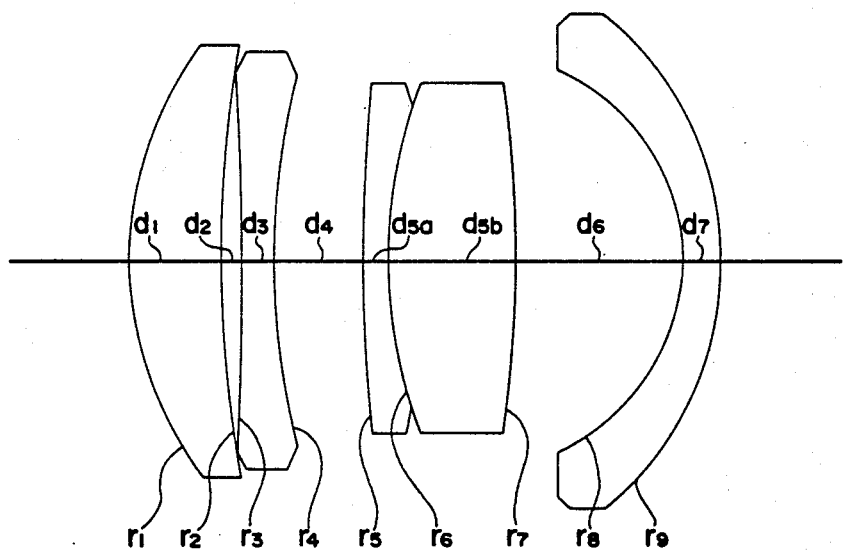
FIG. 4 is a sectional view illustrating a lens construction according to Embodiment 3 of the present invention.
Figure 2:
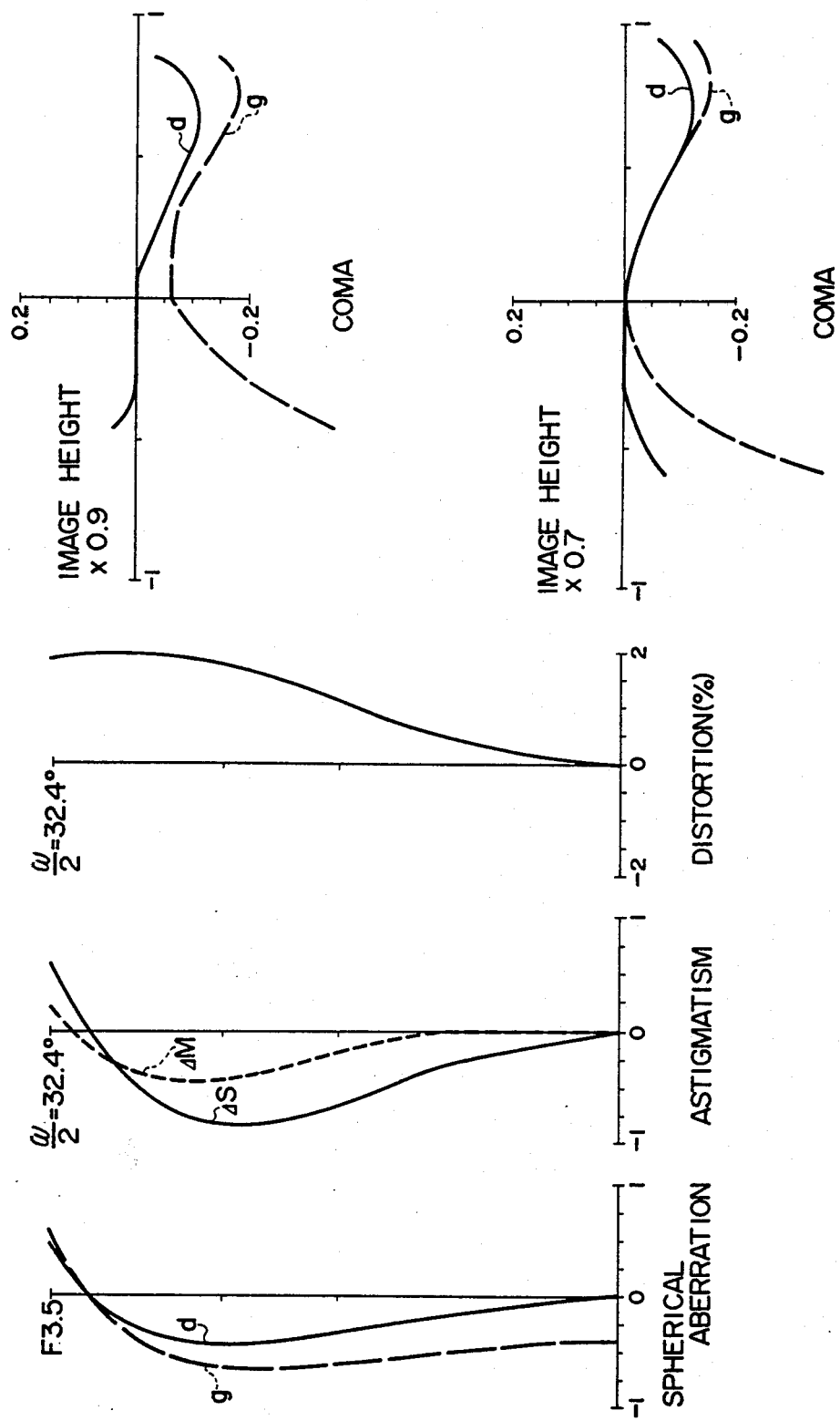
FIG. 2 is a diagram illustrating aberration characteristics curves of a lens system of Embodiment 1 shown in FIG. 1.
Figure 3:
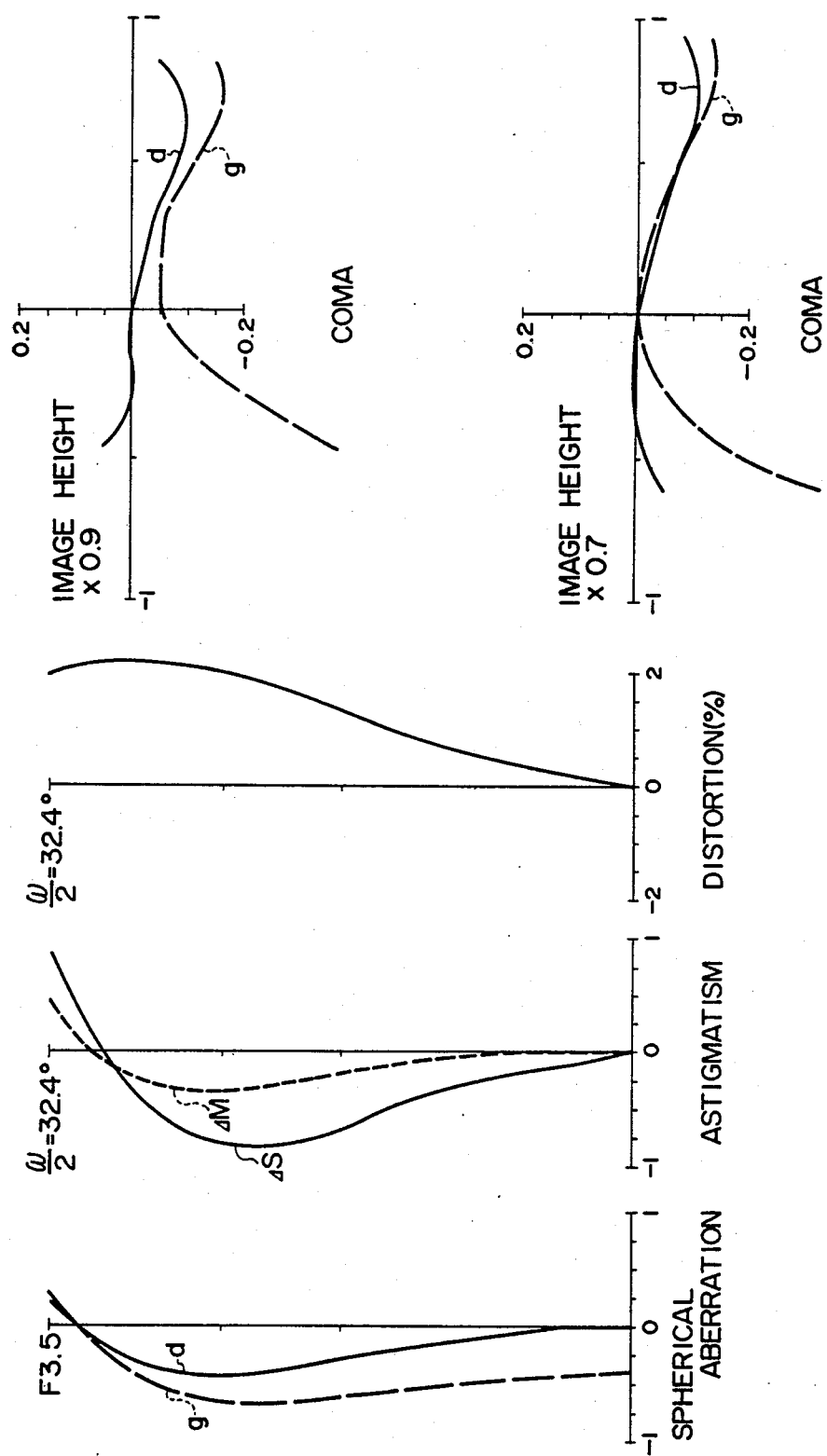
FIG. 3 is a diagram illustrating aberration characteristics curves of a lens system of Embodiment 2 shown in FIG. 1.
Figure 5:
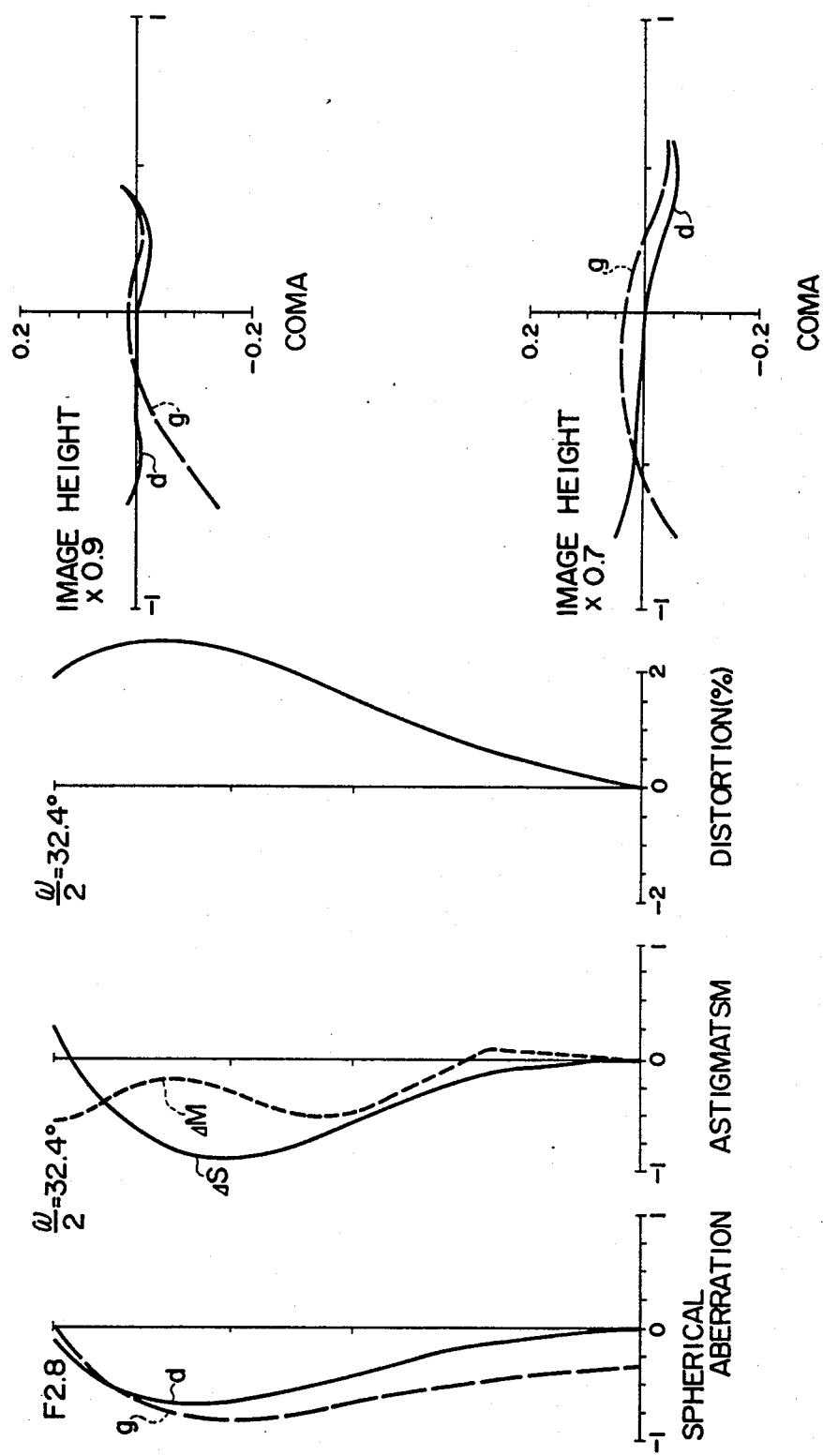
FIG. 5 is a diagram illustrating aberration characteristics curves of Embodiment 3 shown in FIG. 4.

A lens system of the present invention is an objective for use in photographic cameras which comprises a first positive meniscus lens component having a convex surface on the object side, a second biconcave lens component, a third biconvex lens component consisting of a single (FIG. 1) or compound (FIG. 2) lens and a fourth negative meniscus lens component, said fourth lens component having an aspherical surface on the image side and being so designed as to satisfy the following conditions:

$$0.45f < f_{1,2,3} < 0.75f \quad \text{(i)}$$

$$0.15f < d_6 < 0.2f \quad \text{(ii)}$$

The condition (i) defines the resultant focal length from the first lens component to the third lens component. When the lower limit of the condition (i) is exceeded, the overall length of the lens system can be advantageously reduced but correction of offaxial aberrations intended in the present invention is insufficient even if an aspherical surface is introduced. When the upper limit of the condition (i) is exceeded, the overall length can not be reduced. The condition (ii) defines an airspace $d_6$ between the front lens group of the so-called convergent lens system from the first lens component to the third lens component and the rear lens group of the so-called divergent lens system of the fourth lens component. When the airspace $d_6$ increases to some extent the overall length of the lens system is advantageously reduced and aberrations are advantageously corrected. For example, when the airspace $d_6$ is increased with the same overall length, refracting powers of the front and rear lens groups are reduced with the result that aberrations, especially spherical aberrations and astigmatism, are advantageously corrected. There is a tendency to reduce sagittal and meridional curvature of fields so that astigmatism in the marginal portions of an image plane can be reduced. However, the increase of the airspace $d_6$ attended with the increase of asymmetry in the front and rear groups of a lens system. Furthermore, outward coma and distortion of the pin cushion type are apt to be produced. However, these can problems be solved by making the surface of the fourth lens component on its image side an aspherical surface deviated on the object side from the standard spherical surface ($r_8$).

As described above, spherical aberration, astigmatism, coma and distortion are properly corrected and the imaging performance in the marginal portions of the image plane which is intended in the present invention is also corrected properly.

The introduced aspherical surface is intended for correction of higher order aberrations with respect to an image plane (coma higher than the fifth order, distortion higher than the fifth order) and is required to have no adverse effect on spherical aberrations which can be fully corrected in a spherical system. Such requirements are most effectively achieved by introducing an aspherical surface which has a low offaxial ray, a higher principal ray, smaller aspherical constants which are lower than the fourth order on the image side plane of the fourth lens components than that on the object side plane thereof and large aspherical constants higher than the sixth order.

Specifically, assuming that an equation of the aspherical surface is expressed as follows:

$$x_8 = \frac{y_8^2}{r_8 + r_8\sqrt{1-(y_8/r_8)^2}} + Ay_8^4 + By_8^6 + Cy_8^8 + Dy_8^{10}.$$

and the sum of all terms other than the above spherical component is expressed as follows:

$$Ay_8^4 + By_8^6 + Cy_8^8 + Dy_8^{10} = \Delta x_8,$$

it is preferred that the following conditions are satisfied:

$$|\Delta x_8| \leq 5 \times 10^{-4} \cdot f(y_8 \leq 0.1f)$$

and $$|Ay_8^4| \leq 0.1|By_8^6|$$

(where at least the limits of $0.15f \leq y_8 \leq 0.2f$).

The fact that spherical aberrations and aberrations of lower orders regarding paraxial rays are properly corrected is disclosed in the Japanese Laid Open Patent Application No. Sho 55/1980-73014. Accordingly, it is preferred that the foregoing conditions are satisfied in order than pincushion type distortion is not remarkably produced by producing higher order distortion on the negative side without adversely effecting aberrations corrected in the Japanese Patent Application, higher order coma flare is removed and a sufficient quantity of marginal rays is ensured by enhancing the aperture efficiency over marginal portions of field angle. The deviation from these conditions will disadvantageously increase distortion and lower order aberrations regarding paraxial rays.

In addition, the following conditions (iv) through (viii) are imposed for further improvements in correction of aberrations.

$$0.02f < d_4 < 0.087f \quad \text{(iv)}$$

$$0.09f < d_5 < 0.16f \quad \text{(v)}$$

$$0.02f < d_2 < 0.04f \quad \text{(vi)}$$

$$0.5f < |f_4| < 2.0f \quad \text{(vii)}$$

$$\nu_3 < 58.0 \quad \text{(viii)}$$

The condition (iv) defines an air space between the second and third lens components. When the upper limit of the condition (iv) is exceeded, the overall length of a lens system increases and it is difficult to reduce astigmatism over the entire image plane. When the lower limit of the condition (iv) is exceeded, it is impossible to obtain a sufficient effective aperture due to the mechanical interference between the second and third lens components.

The condition (v) defines thickness of the third lens component. When the upper limit of the condition (v) is exceeded, astigmatism is advantageously reduced over the entire image plane but the overall length is apt to increase. When the lower limit of the condition (v) is exceeded, it is difficult to correct astigmatism.

The condition (vi) defines an air space between the first and second lens components. When the upper limit of the condition (vi) is exceeded, it is difficult to correct spherical aberrations and chromatic aberrations. In addition, the overall length of a lens system is apt to increase. When the lower limit of the condition (vi) is exceeded, it is impossible to obtain a sufficient effective aperture due to the mechanical interference between the first and second lens components to cause a shortage of a quantity of marginal rays.

The condition (vii) defines a focal length of the fourth lens component. When the upper limit of the condition (vii) is exceeded, aberrations are advantageously corrected but the overall length of a lens system is apt to increase. When the lower limit of the condition (vii) is exceeded, it is easy to reduce the overall length but correction of aberrations becomes inconvenient. In particular, offaxial aberrations (coma and distortion) are not fully corrected even if an aspherical surface is introduced.

The condition (viii) defines the Abbe's number of a convex lens of the third lens component and is for correcting chromatic coma of lower side rays in offaxial aberrations. When $\nu_3$ ($\nu_{3b}$ in Embodiment 3) is more than 58, the g line of the lower side rays is overcorrected, namely lateral aberration is apt to disadvantageously become a negatively large value.

Referring now to the drawings, Embodiments of the present invention will be described below. In the drawings, $r_1$ through $r_9$ represents radii of curvature on the surfaces of the respective lens elements, $d_1$ through $d_7$ represent thickness of the respective lens elements and airspaces therebetween, $n_1$ through $n_4$ represent refractive indices of the respective lens elements and $\nu_1, \nu_2, \ldots, \nu_4$ represent Abbe's numbers of the respective lens elements.

Embodiment 1
F/3.5, f = 100

| | | |
|---|---|---|
| $r_1 = 27.3450$ | | |
| $d_1 = 10.2642$ | $n_1 = 1.71300$ | $\nu_1 = 53.84$ |
| $r_2 = 66.4902$ | | |
| $d_2 = 2.9326$ | | |
| $r_3 = -170.0328$ | | |
| $d_3 = 2.9326$ | $n_2 = 1.78470$ | $\nu_2 = 26.22$ |
| $r_4 = 40.3043$ | | |
| $d_4 = 3.8124$ | | |
| $r_5 = 49.0974$ | | |
| $d_5 = 9.7950$ | $n_3 = 1.62588$ | $\nu_3 = 35.70$ |
| $r_6 = -76.4065$ | | |
| $d_6 = 16.0130$ | | |
| $r_7 = -16.3299$ | | |
| $d_7 = 3.8124$ | $n_4 = 1.49216$ | $\nu_4 = 57.50$ |
| $r_8 = -22.7751$ (aspherical surface) | | |

Telephoto ratio = 0.999
$f_{1,2,3} = 70.308$
$f_4 = -145.663$
Aspherical constant;
$A = -0.16357 \times 10^{-6}$,
$B = -0.96563 \times 10^{-8}$,
$C = 0.48176 \times 10^{-11}$,
$D = 0.59552 \times 10^{-17}$ Embodiment 2
F/3.5, f = 100

| | | |
|---|---|---|
| $r_1 = 27.1336$ | | |
| $d_1 = 9.9707$ | $n_1 = 1.69350$ | $\nu_1 = 53.23$ |
| $r_2 = 75.7176$ | | |
| $d_2 = 2.9326$ | | |
| $r_3 = -155.5389$ | | |
| $d_3 = 2.9326$ | $n_2 = 1.78470$ | $\nu_2 = 26.22$ |
| $r_4 = 41.2871$ | | |
| $d_4 = 4.1056$ | | |
| $r_5 = 55.1050$ | | |
| $d_5 = 9.7947$ | $n_3 = 1.63636$ | $\nu_3 = 35.37$ |
| $r_6 = -71.0312$ | | |
| $d_6 = 15.6137$ | | |
| $r_7 = -17.1978$ | | |
| $d_7 = 3.8123$ | $n_4 = 1.49216$ | $\nu_4 = 57.50$ |
| $r_8 = -25.1689$ (aspherical surface) | | |

Telephoto ratio = 0.994
$f_{1,2,3} = 68.636$
$f_4 = -131.001$
Aspherical constant;
$A = 0.14440 \times 10^{-6}$,
$B = -0182134 \times 10^{-8}$,
$C = 0.48225 \times 10^{-11}$,
$D = 0.59341 \times 10^{-17}$, Embodiment 3
F/2.8, f = 100

| | | |
|---|---|---|
| $r_1 = 31.7092$ | | |
| $d_1 = 8.7977$ | $n_1 = 1.74100$ | $\nu_1 = 52.68$ |
| $r_2 = 106.7411$ | | |
| $d_2 = 2.0528$ | | |
| $r_3 = -388.0983$ | | |
| $d_3 = 2.9326$ | $n_2 = 1.80518$ | $\nu_2 = 25.43$ |
| $r_4 = 69.5001$ | | |
| $d_4 = 8.4165$ | | |
| $r_5 = 123.2508$ | | |
| $d_{5a} = 2.6394$ | $n_{3a} = 1.51633$ | $\nu_{3a} = 64.15$ |
| $r_6 = 44.6919$ | | |
| $d_{5b} = 12.0235$ | $n_{3b} = 1.62012$ | $\nu_{3b} = 49.66$ |
| $r_7 = -114.4013$ | | |
| $d_6 = 16.2438$ | | |
| $r_8 = -19.0197$ | | |
| $d_7 = 3.4311$ | $n_4 = 1.49216$ | $\nu_4 = 57.50$ |
| $r_9 = -31.5797$ (aspherical surface) | | |

Telephoto ratio = 0.994
$f_{1,2,3} = 68.446$
$f_4 = -106.789$
Aspherical constant;
$A = 0.19703 \times 10^{-6}$,
$B = =0.12836 \times 10^{-7}$,
$C = 0.29033 \times 10^{-10}$
$D = -0.41649 \times 10^{-13}$

What is claimed is:

1. A compact photographic camera lens system of short overall length, comprising:
   a first positive meniscus lens component having a convex surface on the object side thereof;
   a second biconcave lens componet;
   a third biconvex lens component; and
   a fourth negative meniscus lens component;
   said fourth lens component having only one aspherical surface which is provided on the image side thereof, said aspherical surface being given by the following equation $$x_8 = \frac{y_8^2}{r_8 + r_8\sqrt{1-(y_8/r_8)^2}} + Ay_8^4 + By_8^6 + Cy_8^8 + Dy_8^{10} \quad \text{(i)}$$

where the sum of all the terms other than the component representing the spherical surface is expressed by $$Ay_8^4 + By_8^6 + Cy_8^8 + Dy_8^{10} = \Delta x_8,$$

with the conditions $\Delta x_8 \leq 0$ and $|\Delta x_8| \leq 5 \times 10^{-4}f$, ($y_8 \leq 0.1f$) being satisfied and with the further conditions $|Ay_8^4| \leq 0.1|By_8^6|$ with the limits of at least $0.15f \leq y_8 \leq 0.2f$ also being satisfied, wherein f represents a focal length of the total system and A, B, C and D represent aspherical constants.

2. A compact photographic camera lens system of the type described in claim 1 wherein said third biconvex lens component consists of a compound lens.

3. A compact photographic camera lens system according to claim 1 in which the lens system is designed to satisfy the following conditions:

$$0.45f < f_{1,2,3} < 0.75f \quad \text{(ii)}$$

$$0.15f < d_6 < 0.2f \quad \text{(iii)}$$

wherein f represents a focal length, $f_{1,2,3}$ represents a resultant focal length of the lens group consisting of said first through third lens components, and $d_6$ represents air space between said third and fourth lens components.

4. A compact photographic camera lens system according to claim 3 wherein, in order to further improve the correction of aberrations, the lens system is further modified as follows:

$$0.02f < d_4 < 0.087f \quad \text{(iv)}.$$

5. A compact photographic camera lens system according to claim 3 in order to further improve the correction of aberrations, the lens system of further modified as follows:

$$0.09f < d_5 < 0.16f \quad \text{(iv)}.$$

6. A compact photographic camera lens system according to claim 3 wherein, in order to further improve the correction of aberrations, the lens system is further modified as follows:

$$0.02f < d_2 < 0.04f \quad \text{(iv)}.$$

7. A compact photographic camera lens system according to claim 3 wherein, in order to further improve the correction of aberrations, the lens system is further modified as follows:

$$0.05f < |f_4| < 2.00f \quad \text{(iv)}.$$

8. A compact photographic camera lens system according to claim 3 wherein, in order to further improve the correction of aberrations, the lens system is further modified as follows:

$$v_3 < 58.0 \quad \text{(iv)}.$$

9. A compact photographic camera lens system according to claim 1, in which said third lens component comprises a single lens and has the following values:

$r_1 = 27.1336$
$d_1 = 9.9707 \quad n_1 = 1.69350 \quad v_1 = 53.23$
$r_2 = 75.7176$
$d_2 = 2.9326$
$r_3 = -155.5389$
$d_3 = 2.9326 \quad n_2 = 1.78470 \quad v_2 = 25.22$
$r_4 = 41.2871$
$d_4 = 4.1056$
$r_5 = 55.1050$
$d_5 = 9.7947 \quad n_3 = 1.63636 \quad v_3 = 35.37$
$r_6 = 71.0312$
$d_6 = 15.6137$
$r_7 = -17.1978$
$d_7 = 3.8123 \quad n_4 = 1.49216 \quad v_4 = 57.50$
$r_8 = -25.1689$ (aspherical surface)
F/3.5, f = 100
Telephoto ratio = 0.994
$f_{1.2.3} = 68.636$
$f_4 = -131.001$
Aspherical constant;
$A = 0.14440 \times 10^{-6}, \quad B = -0.82134 \times 10^{-8}$
$C = 0.48225 \times 10^{-11}, \quad D = 0.59341 \times 10^{-7}$ Wherein:
r = Radius of curvature of each surface of a lens in order from the object side;
d = Thickness of each lens and spacing between lenses in order from the object side;
n = Radius index of each lens in order from the object side; and
v = Abbe number of each lens in order from the object side.

10. A compact photographic camera lens system according to claim 1, in which said third lens component comprises a compound lens composed of negative and positive lenses and has the following values:

$r_1 = 31.7092$
$d_1 = 8.7977 \quad n_1 = 1.74100 \quad v_1 = 52.68$
$r_2 = 106.7411$
$d_2 = 2.0528$
$r_3 = -388.0983$
$d_3 = 2.9326 \quad n_2 = 1.80518 \quad v_2 = 25.43$
$r_4 = 69.5001$
$d_4 = 8.4165$
$r_5 = 123.2508$
$d_{5a} = 2.6394 \quad n_{3a} = 1.51633 \quad v_{3a} = 64.15$
$r_6 = 44.6919$
$d_{5b} = 12.0235 \quad n_{3b} = 1.62012 \quad v_{3b} = 49.66$
$r_7 = -114.4013$
$d_6 = 16.2438$
$r_8 = -19.0197$
$d_7 = 3.3411 \quad n_4 = 1.49216 \quad v_4 = 57.50$
$r_9 = -31.5797$ (aspherical surface)
F/2.8, f = 100
$f_{1.2.3} = -68.446 \quad f_4 = -106.789$
Aspherical constant;
$A = 0.19703 \times 10^{-6}, \quad B = -0012836 \times 10^{-7}$
$C = 0.29033 \times 10^{-10}, \quad 0.41649 \times 10^{-13}$.

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

11. A compact photographic camera lens system according to claim 1 further satisfying the following conditions $$0.02 < d_4 < 0.087f \quad \text{(iv)}$$

$$0.09f < d_5 < 0.16f \quad \text{(v)}$$

$$0.02f < d_2 < 0.04f \quad \text{(vi)}$$

$$0.5f < |f_4| < 2.0f \quad \text{(vii)}$$

$$v_3 < 58.0 \quad \text{(viii)}$$

wherein d represents lens thickness and air space and $v_3$ represents the Abbe's number of glass of said third biconvex lens component.

12. A compact photographic camera lens system according to claim 11, in which said third lens component comprises a single lens and has the following values:

$r_1 = 27.3450$
$d_1 = 10.2642 \quad n_1 = 1.71300 \quad v_1 = 53.84$
$r_2 = 66.4902$
$d_2 = 2.9326$
$r_3 = -170.0328$
$d_3 = 2.9326 \quad n_2 = 1.78470 \quad v_2 = 26.22$
$r_4 = 40.3043$
$d_4 = 3.8124$
$r_5 = 49.0974$
$d_5 = 9.7950 \quad n_3 = 1.62588 \quad v_3 = 35.70$
$r_6 = -76.4065$
$d_6 = 16.0130$
$r_7 = -16.3299$
$d_7 = 3.8124 \quad n_4 = 1.49216 \quad v_4 = 57.50$
$r_8 = -22.7751$ (aspherical surface)
F/3.5, f = 100
Telephoto ration = 0.999
$f_{1.2.3} = 70.308 \quad f_4 = 145.663$
$A = -0.16357 \times 10^{-6}, \quad B = -0.96563 \times 10^{-8}$
$C = 0.48176 \times 10^{-11}, \quad D = 0.59552 \times 10^{-17}$.

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

13. A compact photographic camera lens system according to claim 11, in which said third lens component comprises a single lens and has the following values:

$r_1 = 27.1336$

-continued

```
d₁ = 9.9707        n₁ = 1.69350      ν₁ = 53.23
r₂ = 75.7176
d₂ = 2.9326
r₃ = −155.5389
d₃ = 2.9326        n₂ = 1.78470      ν₂ = 25.22
r₄ = 41.2871
d₄ = 4.1056
r₅ = 55.1050
d₅ = 9.7947        n₃ = 1.63636      ν₃ = 35.37
r₆ = 71.0312
d₆ = 15.6137
r₇ = −17.1978
d₇ = 3.8123        n₄ = 1.49216      ν₄ = 57.50
r₈ = −25.1689 (aspherical surface)
F/3.5, f = 100
Telephoto ratio = 0.994
f₁,₂,₃ = 68.636
f₄ = −131.001
Aspherical constant;
A = 0.14440 × 10⁻⁶,      B = −0.82134 × 10⁻⁸
C = 0.48225 × 10⁻¹¹,     D = 0.59341 × 10⁻⁷
```

Wherein:

r = Radius of curvature of each surface of a lens in order from the object side;

d = Thickness of each lens and spacing between lenses in order from the object side;

n = Refractive index of each lens in order from the object side; and

ν = Abbe number of each lens in order from the object side.

14. A compact photographic camera lens system according to claim 11, in which said third lens component comprises a compound lens composed of negative and positive lenses and has the following values:

```
r₁ = 31.7092
d₁ = 8.7977        n₁ = 1.74100      ν₁ = 52.68
r₂ = 106.7411
d₂ = 2.0528
r₃ = −388.0983
d₃ = 2.9326        n₂ = 1.80518      ν₂ = 25.43
r₄ = 69.5001
d₄ = 8.4165
r₅ = 123.2508
d₅ₐ = 2.6394       n₃ₐ = 1.51633     ν₃ₐ = 64.15
r₆ = 44.6919
d₅ᵦ = 12.0235      n₃ᵦ = 1.62012     ν₃ᵦ = 49.66
r₇ = −114.4013
d₆ = 16.2438
r₈ = −19.0197
d₇ = 3.4311        n₄ = 1.49216      ν₄ = 57.50
r₉ = −31.5797 (aspherical surface)
F/2.8, f = 100
f₁,₂,₃ = −68.446                     f₄ = −106.789
Aspherical constant;
A = 0.19703 × 10⁻⁶,      B = −0012836 × 10⁻⁷
C = 0.29033 × 10⁻¹⁰,     0.41649 × 10⁻¹³.
```

Wherein:

r = Radius of curvature of each surface of a lens in order from the object side;

d = Thickness of each lens and spacing between lenses in order from the object side;

n = Refractive index of each lens in order from the object side; and

ν = Abbe number of each lens in order from the object side.

15. A compact photographic camera lens system according to claim 1, further satisfying the following conditions $$0.02 < d_4 < 0.087 f \quad \text{(iv)}$$

$$0.09 f < d_5 < 0.16 f \quad \text{(v)}$$

$$0.02 f < d_2 < 0.04 f \quad \text{(vi)}$$

$$0.5 f < |f_4| < 2.0 f \quad \text{(vii)}$$

$$\nu_3 < 58.0 \quad \text{(viii)}$$

wherein d represents lens thickness and air space and $\nu_3$ represents the Abbe's number of glass of said third biconvex lens component.

16. A compact photographic camera lens system according to claim 15, in which said third lens component comprises a single lens and has the following values:

```
r₁ = 27.3450
d₁ = 10.2642       n₁ = 1.71300      ν₁ = 53.84
r₂ = 66.4902
d₂ = 2.9326
r₃ = −170.0328
d₃ = 2.9326        n₂ = 1.78470      ν₂ = 26.22
r₄ = 40.3043
d₄ = 3.8124
r₅ = 49.0974
d₅ = 9.7950        n₃ = 1.62588      ν₃ = 35.70
r₆ = −76.4065
d₆ = 16.0130
r₇ = −16.3299
d₇ = 3.8124        n₄ = 1.49216      ν₄ = 57.50
r₈ = −22.7751 (aspherical surface)
F/3.5, f = 100
Telephoto ratio = 0.999
f₁,₂,₃ = 70.308                      f₄ = 145.663
A = −0.16357 × 10⁻⁶,     B = −0.96563 × 10⁻⁸
C = 0.48176 × 10⁻¹¹,     D = 0.59552 × 10⁻¹⁷.
```

Wherein:

r = Radius of curvature of each surface of a lens in order from the object side;

d = Thickness of each lens and spacing between lenses in order from the object side;

n = Refractive index of each lens in order from the object side; and

ν = Abbe number of each lens in order from the object side.

17. A compact photographic camera lens system according to claim 15, in which said third lens component comprises a single lens and has the following values:

```
r₁ = 27.1336
d₁ = 9.9707        n₁ = 1.69350      ν₁ = 53.23
r₂ = 75.7176
d₂ = 2.9326
r₃ = −155.5389
d₃ = 2.9326        n₂ = 1.78470      ν₂ = 25.22
r₄ = 41.2871
d₄ = 4.1056
r₅ = 55.1050
d₅ = 9.7947        n₃ = 1.63636      ν₃ = 35.37
r₆ = 71.0312
d₆ = 15.6137
r₇ = −17.1978
d₇ = 3.8123        n₄ = 1.49216      ν₄ = 57.50
r₈ = −25.1689 (aspherical surface)
F/3.5, f = 100
Telephoto ratio = 0.994
f₁,₂,₃ = 68.636
f₄ = −131.001
Aspherical constant;
A = 0.14440 × 10⁻⁶,      B = −0.82134 × 10⁻⁸
```

-continued

| | |
|---|---|
| $C = 0.48225 \times 10^{-11}$, | $D = 0.59341 \times 10^{-7}$ |

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

18. A compact photographic camera lens system according to claim 15, in which said third lens component comprises a compound lens composed of negative and positive lenses and has the following values:

$r_1 = 31.7092$
$d_1 = 8.7977$    $n_1 = 1.74100$    $v_1 = 52.68$
$r_2 = 106.7411$
$d_2 = 2.0528$
$r_3 = -388.0983$
$d_3 = 2.9326$    $n_2 = 1.80518$    $v_2 = 25.43$
$r_4 = 69.5001$
$d_4 = 8.4165$
$r_5 = 123.2508$
$d_{5a} = 2.6394$    $n_{3a} = 1.51633$    $v_{3a} = 64.15$
$r_6 = 44.6919$
$d_{5b} = 12.0235$    $n_{3b} = 1.62012$    $v_{3b} = 49.66$
$r_7 = -114.4013$
$d_6 = 16.2438$
$r_8 = -19.0197$
$d_7 = 3.4311$    $n_4 = 1.49216$    $v_4 = 57.50$
$r_9 = -31.5797$ (aspherical surface)
F/2.8, f = 100
$f_{1,2,3} = -68.446$    $f_4 = -106.789$
Aspherical constant;
$A = 0.19703 \times 10^{-6}$,    $B = -0012836 \times 10^{-7}$
$C = 0.29033 \times 10^{-10}$,    $0.41649 \times 10^{-13}$.

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

19. A compact photographic camera lens system according to claim 1, in which said third lens component comprises a single lens and has the following values:

$r_1 = 27.3450$
$d_1 = 10.2642$    $n_1 = 1.71300$    $v_1 = 53.84$
$r_2 = 66.4902$
$d_2 = 2.9326$
$r_3 = -170.0328$
$d_3 = 2.9326$    $n_2 = 1.78470$    $v_2 = 26.22$
$r_4 = 40.3043$
$d_4 = 3.8124$
$r_5 = 49.0974$
$d_5 = 9.7950$    $n_3 = 1.62588$    $v_3 = 35.70$
$r_6 = -76.4065$
$d_6 = 16.0130$
$r_7 = -16.3299$
$d_7 = 3.8124$    $n_4 = 1.49216$    $v_4 = 57.50$
$r_8 = -22.7751$ (aspherical surface)
F/3.5, f = 100
Telephone ratio = 0.999

-continued $f_{1,2,3} = 70.308$    $f_4 = -145.663$
$A = -0.16357 \times 10^{-6}$,    $B = -0.96563 \times 10^{-8}$
$C = 0.48176 \times 10^{-11}$,    $D = 0.59552 \times 10^{-17}$.

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

20. A compact photographic camera lens system according to claim 1, in which said third lens component comprises a single lens and has the following values:

$r_1 = 27.3450$
$d_1 = 10.2642$    $n_1 = 1.71300$    $v_1 = 53.84$
$r_2 = 66.4902$
$d_2 = 2.9326$
$r_3 = -170.0328$
$d_3 = 2.9326$    $n_2 = 1.78470$    $v_2 = 26.22$
$r_4 = 40.3043$
$d_4 = 3.8124$
$r_5 = 49.0974$
$d_5 = 9.7950$    $n_3 = 1.62588$    $v_3 = 35.70$
$r_6 = -76.4065$
$d_6 = 16.0130$
$r_7 = -16.3299$
$d_7 = 3.8124$    $n_4 = 1.49216$    $v_4 = 57.50$
$r_8 = -22.7751$ (aspherical surface)
F/3.5, f = 100
Telephoto ratio = 0.999
$f_{1,2,3} = 70.308$    $f_4 = -145.663$
Aspherical constant;
$A = -0.16357 \times 10^{-6}$,    $B = -0.96563 \times 10^{-8}$,
$C = 0.48176 \times 10^{-11}$,    $D = 0.59552 \times 10^{-17}$.

Wherein:
r = Radius of curvature of each surface of a lens in order from the object side;
d = Thickness of each lens and spacing between lenses in order from the object side;
n = Refractive index of each lens in order from the object side; and
v = Abbe number of each lens in order from the object side.

21. A compact photographic camera lens system according to claim 1, in which said third lens component comprises a single lens and has the following values:

$r_1 = 27.1336$
$d_1 = 9.9707$    $n_1 = 1.69350$    $v_1 = 53.23$
$r_2 = 75.7176$
$d_2 = 2.9326$
$r_3 = -155.5389$
$d_3 = 2.9326$    $n_2 = 1.78470$    $v_2 = 26.22$
$r_4 = 41.2871$
$d_4 = 4.1056$
$r_5 = 55.1050$
$d_5 = 9.7947$    $n_3 = 1.63636$    $v_3 = 35.37$
$r_6 = -71.0312$
$d_6 = 15.6137$
$r_7 = 17.1978$
$d_7 = 3.8123$    $n_4 = 1.49216$    $v_4 = 57.50$
$r_8 = -25.1689$ (aspherical surface)
F/3.5, f = 100

-continued

Telephoto ratio = 0.994
$f_{1,2,3} = 68.636$
$f_4 = -131.001$
Aspherical constant;
$A = 0.14440 \times 10^{-6}$, $B = -0.82134 \times 10^{-8}$
$C = 0.48225 \times 10^{-11}$, $D = 0.59341 \times 10^{-17}$.

Wherein:
 r = Radius of curvature of each surface of a lens in order from the object side;
 d = Thickness of each lens and spacing between lenses in order from the object side;
 n = Refractive index of each lens in order from the object side; and
 v = Abbe number of each lens in order from the object side.

22. A compact photographic camera lens system according to claim 1, in which said third lens component comprises a compound lens composed of negative and positive lenses and has the following values:

$r_1 = 31.7092$
$d_1 = 8.7977$  $n_1 = 1.74100$  $v_1 = 52.68$
$r_2 = 106.7411$
$d_2 = 2.0528$

-continued $r_3 = -388.0983$
$d_3 = 2.9326$  $n_2 = 1.80518$  $v_2 = 25.43$
$r_4 = 69.5001$
$d_4 = 8.4165$
$r_5 = 123.2508$
$d_{5a} = 2.6394$  $n_{3a} = 1.51633$  $v_{3a} = 64.15$
$r_6 = 44.6919$
$d_{5b} = 12.0235$  $n_{3b} = 1.62012$  $v_{3b} = 49.66$
$r_7 = -114.4013$
$d_6 = 16.2438$
$r_8 = -19.0197$
$d_7 = 3.4311$  $n_4 = 1.49216$  $v_4 = 57.50$
$r_9 = -31.5797$ (aspherical surface)
F/2.8, f = 100
$f_{1,2,3} = 68.446$  $f_4 = -106.789$
Aspherical constant;
$A = 0.19703 \times 10^{-6}$, $B = -0.12836 \times 10^{-7}$,
$C = 0.29033 \times 10^{-10}$, $D = -0.41649 \times 10^{-13}$.

Wherein:
 r = Radius of curvature of each surface of a lens in order from the object side;
 d = Thickness of each lens and spacing between lenses in order from the object side;
 n = Refractive index of each lens in order from the object side; and
 v = Abbe number of each lens in order from the object side.

* * * * *

UNITED STATES PATENT AND TRADEMARK OFFICE
CERTIFICATE OF CORRECTION

PATENT NO. : 4,659,190

DATED : April 21, 1987

INVENTOR(S) : Shin-ichi Mihara

It is certified that error appears in the above-identified patent and that said Letters Patent is hereby corrected as shown below:

Column 1, line 16, change "where" to --wherein--.

Signed and Sealed this

Twenty-second Day of September, 1987

*Attest:*

DONALD J. QUIGG

*Attesting Officer*     *Commissioner of Patents and Trademarks*